United States Patent
Chandra et al.

[11] Patent Number: 6,052,218
[45] Date of Patent: Apr. 18, 2000

[54] HIGH BRIGHTNESS OPTICAL PARAMETRIC AMPLIFIER ARRAY

[75] Inventors: Suresh Chandra, Springfield; Geraldine H. Daunt, Arlington, both of Va.; Michael J. Ferry, Bethesda, Md.

[73] Assignee: The United States of America as represented by the Secretary of the Army, Washington, D.C.

[21] Appl. No.: 09/040,192

[22] Filed: Feb. 12, 1998

[51] Int. Cl.[7] .................................................. H01S 3/00
[52] U.S. Cl. ............................................ 359/333; 359/330
[58] Field of Search .............................. 372/21; 359/330, 359/333

[56] References Cited

U.S. PATENT DOCUMENTS

| | | | |
|---|---|---|---|
| H1742 | 8/1998 | Richmond | 356/4.01 |
| 4,803,439 | 2/1989 | Ryan | 330/4.3 |
| 5,260,954 | 11/1993 | Dane et al. | 372/25 |
| 5,291,503 | 3/1994 | Geiger et al. | 372/21 |
| 5,661,595 | 8/1997 | Stamm et al. | 359/330 |
| 5,786,929 | 7/1998 | Nabors | 359/330 |

*Primary Examiner*—Mark Hellner
*Attorney, Agent, or Firm*—Paul S. Clohan, Jr.; Mark D. Kelly; William E. Eshelman

[57] ABSTRACT

A high brightness optical parametric amplifier array uses energy—scaleable optical parametric amplifiers that provide high brightness output. The scaleability in energy is achieved by using an array of parallel crystal amplifiers to handle high laser energies. High brightness is obtained by using an optical phase conjugator to keep the phase front of the array coherent.

10 Claims, 3 Drawing Sheets

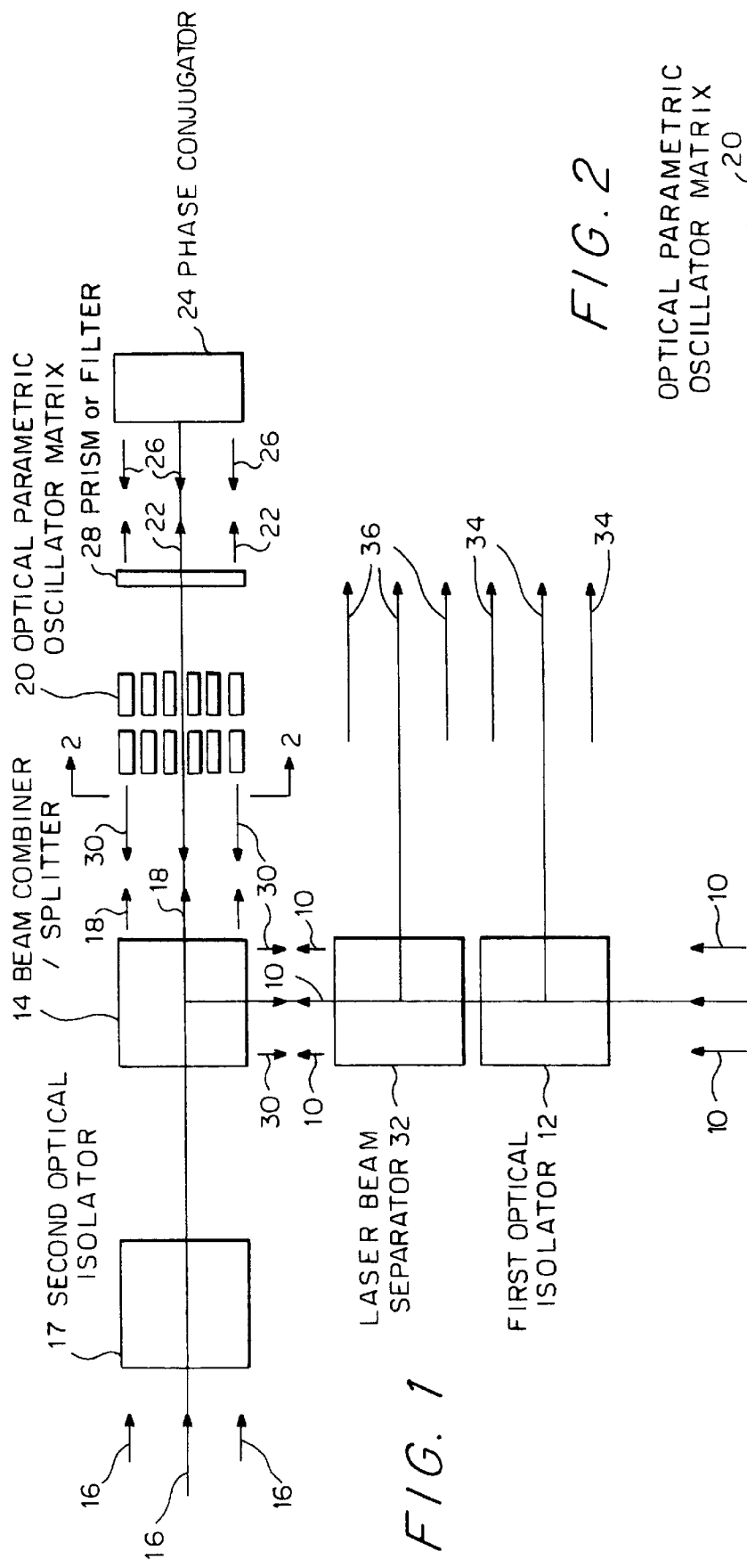

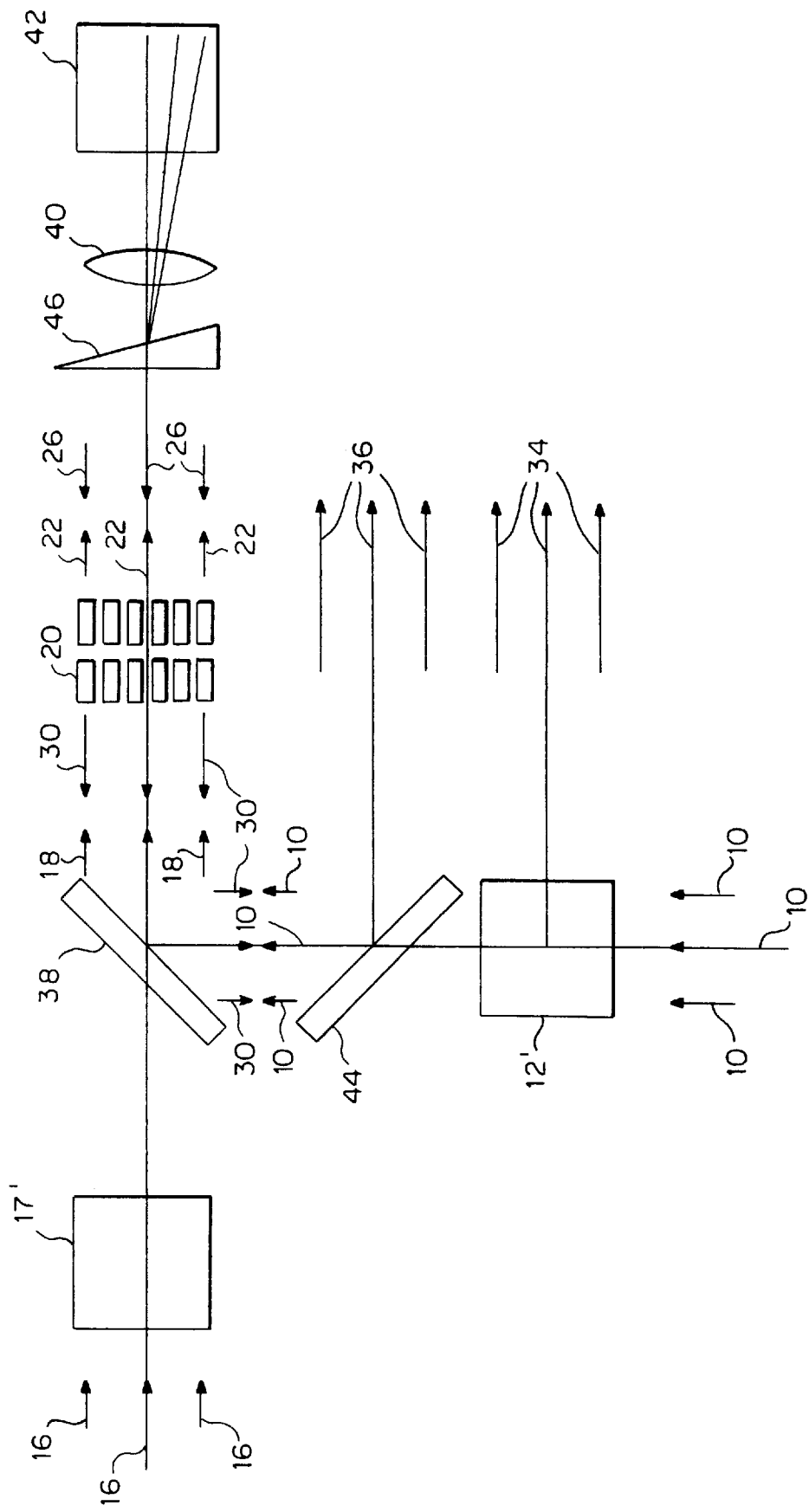

HIGH BRIGHTNESS OPTICAL PARAMETRIC AMPLIFIER ARRAY

GOVERNMENTAL INTEREST

The information described herein may be manufactured, used and licensed by or for the United States Government for governmental purposes.

BACKGROUND OF THE INVENTION

Laser radiation is presently used in various devices by industry, commerce, medicine and armed services. In certain applications, the need exists for wavelength—tunable laser radiation having both high brightness and high energy capability. In the past optical parametric amplifiers (OPAS) and optical parametric oscillators (OPOs) have been used as devices for generating wavelength—tunable laser radiation with limited energy output. Prior art OPAs usually comprised an appropriately cut nonlinear birefringent crystal which amplified a weak "signal" beam by channeling energy from a strong "pump" beam of shorter wavelength. Two or more crystals were sometimes used in series to increase the OPA gain. In prior art devices the signal beam and pump beam usually arrive at the OPA colinearly. The difference of the photonenergies between the pump and signal beams is emitted in the form of an "idler" beam.

The parametric process is most effective when the "phase matching condition" is satisfied among the pump, signal and idler waves. The phase matching is satisfied by choosing appropriate angles between the crystal axes and the beam directions.

The optical parametric oscillator (OPO) is essentially the same as an OPA with a resonator cavity. In the case of an OPO, only a pump beam needs to be provided. The signal and idler beams are both generated within the resonator cavity. The wavelength of the generated signal idler pair are determined by the phase matching condition. The output wave-lengths may be tuned simply by changing the angle of the pump incidence, which is usually done by turning the crystal in the cavity.

One of the problems with the aforementioned is that all crystals, including those used for parametric conversion, have some laser intensity limit beyond which they damage. Since the size of the crystals that can be grown is limited, there is a limit on how much energy may be converted by a single aperature optical parametric array.

In the past when there was a need to frequency convert large amounts of pump laser energies one might have thought to use an array of many parallel OPAS. By using such a parallel arrangement one would scale up the energy conversion, but at the cost of ruining the beam phase fronts. The phase front degradation in a parallel OPA arrangement is caused by the fact that each individual OPA has slightly different lengths. The different lengths, when measured to a fraction of the laser wavelength, causes different parts of the original phase front to experience differing optical path lengths which leads to distortions of the phase front. The aforementioned phenomena of phase front degradation caused by differing optical path lengths is called "piston error". Phase front distortions results in an increase in beam divergence and lower brightness. This condition is generally unacceptable because for most laser applications the beam brightness is of central importance. A similar problem occurs in scaling up laser amplifiers.

SUMMARY OF THE INVENTION

The present invention relates to energy—scaleable optical parametric amplifiers that provide a high brightness output.

An object of the invention is to provide energy scaleable parametric amplifiers with high brightness capability using a number of parallel optical parametric amplifiers arranged in a matrix using appropriate optical phase conjugate mirror to prevent phase front distortion.

A further object of the present invention is to provide a high-energy high brightness optical parametric amplifier wherein the scaleability in energy is achieved by using an array of parallel crystal amplifiers whose numbers can be increased to handle high laser energies.

For a better understanding of the present invention, together with other and further objects thereof, reference is made to the following description taken in connection with the accompanying drawings.

BRIEF DESCRIPTION OF THE DRAWINGS

FIG. 1 is a schematic drawing of a generic high-brightness optical parametric amplifier array.

FIG. 2 is a front view of the optical parametric amplifier array taken along line 2—2 of FIG. 1.

FIG. 4 is a schematic drawing of a second embodiment of a high-brightness optical parametric amplifier array.

Throughout the following description, like numerals are used to denote like parts of the drawings.

DETAILED DESCRIPTION OF THE PREFERRED EMBODIMENTS

Figure 3:
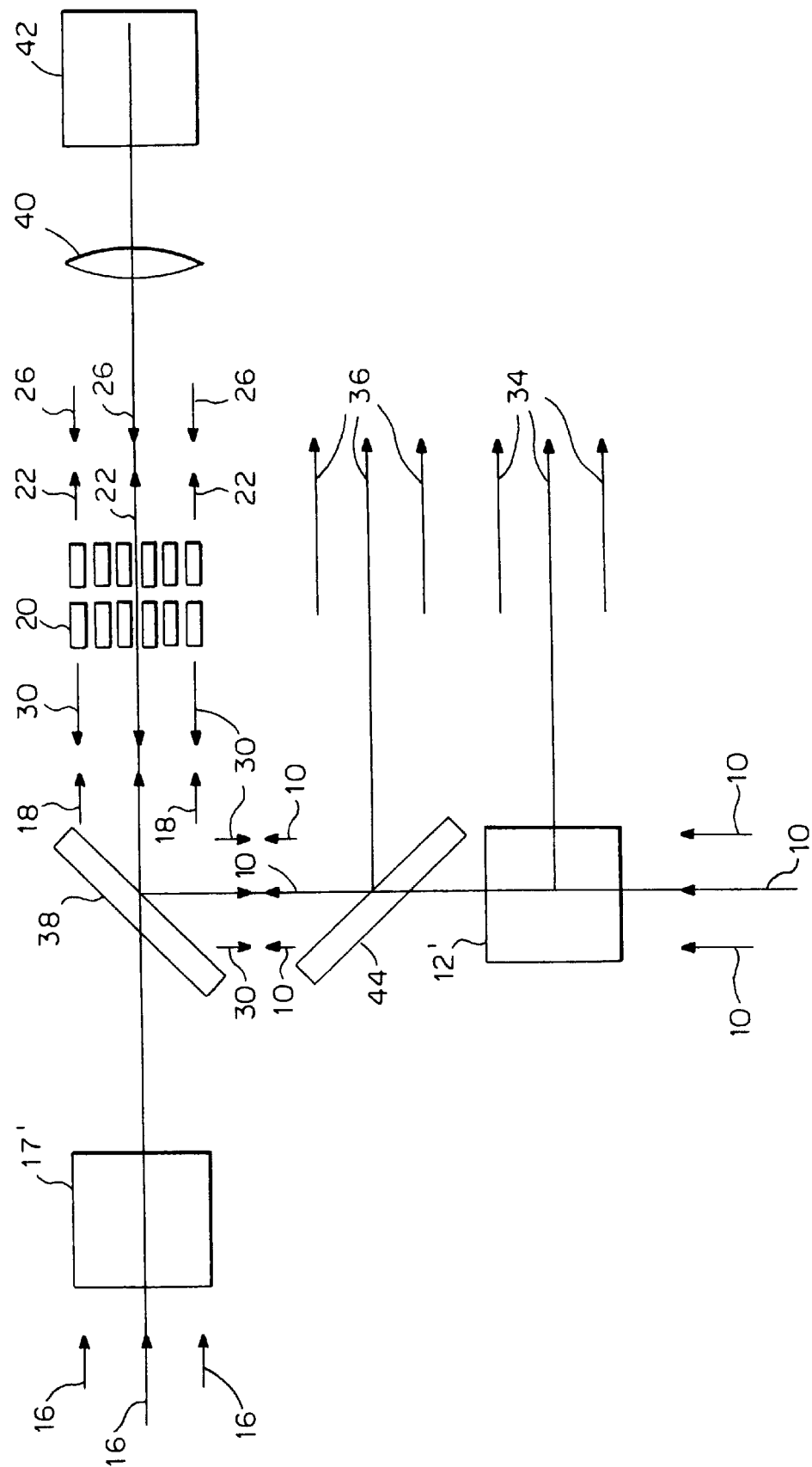
FIG. 3 is a schematic drawing of a first embodiment of a high-brightness optical parametric amplifier array.

Referring now to the generic high-brightness OPA array of FIGS. 1 and 2, a low power and high-quality low divergence signal beam 10 is directed toward a first optical isolator 12 and passes through it and proceeds on to a beam combiner/splitter 14. A high energy pump laser beam 16 is directed toward a second optical isolator 17 and passes through it and proceeds on to the beam combiner/splitter 14. Signal beam 10 which is equal in diameter to that of the pump beam 16 is reflected by beam combiner/splitter 14 and combines with the high energy pump laser beam 16. The combined signal and pump beams 18 arrive together at parallel OPAs arranged in a matrix 20 which amplifies the signal beam 10 as it depletes the pump beam 16 and generates an idler beam. Because of "piston errors", aforementioned, among the individual OPAS, the uniform phase front of the signal beam gets broken up upon exiting the OPA array 20. The depleted pump beam and idler beam phase fronts also become similarly broken up. The broken up phase fronts 22 of the signal, pump and idle beams are directed toward a phase conjugator 24 which reverses the phases and the directions of propagation of each phase front.

The phase conjugate mirror (PCM) may consist of a lens and a stimulated Brillouin scattering (SBS) cell. Common SBS materials include liquids such as carbon tetrachloride or freon and pressurized gases like nitrogen and methane. Alternatively, the PCM can be an electromechanical deformable adaptive optics mirror. The reversed phase conjugated signal, pump and idler beams 26 travel backwards and for a second time through the OPA array 20 where further parametric amplification takes place. A prism or filter member 28 is operatively positioned intermediate the OPA array 20 and phase conjugator 24. The prism or filter member function will be described hereinafter.

The backward travel of the phase reversed phase fronts results in a restoration of the uniform phase fronts through the well known properties of optical phase conjugation. In this manner, one is able to achieve energy amplification by an array of OPAs without ruining the phase front and sacrificing beam brightness. The residual pump beam passes through the combiner/splitter 14 and is dumped by the second optical isolator 17. The amplified phase conjugated signal and idler beams 30 are reflected by beam splitter 14 in the direction of signal optical isolator 12 and idler beam separator 32. The signal beam arriving back at the first isolator 12 is reflected off as the amplified signal output 34. The idler beam arriving at idler separator 32 is reflected off as an amplified idler output 36, which generally is a useful output.

Referring now to FIG. 3, in this first embodiment, the optical isolators 12 and 17 of FIG. 1 are shown as first and second Faraday isolators 12 and 17 respectively. The Faraday isolator is a one-way device that passes the incident beam in one direction only and reflects to one side a beam propagating in the reverse direction.

In operation, this embodiment of FIG. 3 uses a short-wavelength passing mirror 38 which allows the pump beam 16 to pass through but is fully reflective of longer wavelength signal and idler radiation. The pump and signal beams, 16 and 10 respectively, arriving at the short pass mirror 38 combine and then propagate together as a combined beam 18 to the OPA array 20 where the signal beam 10 is amplified and the idler wave is generated. As previously stated, the OPA array introduces distortions into all the phase fronts. The distorted pump, signal and idler waves 22 are then focused with a lens 40 into a stimulated Brillouin scattering (SBS) cell 42 which reverses the phase of each of the waves. The phase reversed waves 26 then travel backward through the OPA array 20 where they undergo a phase restoration to form nearly uniform phase fronts. The second backward passage through the OPA array 20 results in further parametric amplification of the signal and idler beams 30 and further depletion of the pump beam. The waves next arrive back at the short-pass mirror 38 which transmits the residual pump beam and reflects the vastly amplified signal and idler beams toward the Faraday isolator 12'.

If the signal and idler beams are of the same polarization, as is the case in Type I phase matched parametric amplification, and are nearly equal in wavelength, then Faraday isolator 12' will reflect off to one side both waves at the output. If the signal and the idler beams differ significantly in wavelength, a dichroic mirror 44 is used to split off the amplified idler beam 36 prior to the signal reaching the Faraday isolator 12'. When the idler beam is orthogonally polarized with respect to the signal beam, as in a type II phase matching, a polarizer is used to separate out the idler from the signal beam.

Referring now to FIG. 4, when there is a significant difference of wavelengths of the pump, idler and signal beams causing interference in conjugating from a common focal volume, a dispersive prism 46 is inserted in the beam path in front of lens 40. The prism 46 will cause each wave length to come to a focus in a separate volume.

Finally, it should be noted that it is not essential to conjugate all of the waves. At the cost of some conversion efficiency one may conjugate just the signal beam alone or the signal and the pump beams and dump the remaining waves with a filter 28 positioned as shown in FIG. 1.

While specific embodiments of the invention have been shown and described in detail to illustrate the application of the principles of the invention, it will be understood that the invention may be embodied otherwise without departing from such principles.

What is claimed is:

1. A high brightness optical parametric amplifier array which comprises:

a first optical isolator means for receiving an expanded low power long wave length input signal beam, for passing an incident beam of said signal beam in one direction only and for reflecting to one side a signal beam propagating in a reverse direction and for acting as an output coupler of an amplified signal beam returning to said first isolator means;

a second optical isolator means for receiving a high energy short wave length pump laser beam and for passing an incident beam of said pump beam in one direction only;

beam combiner/splitter means optically in alignment with the output of said first and second isolator means for passing said shorter wave length pump beam and reflecting said longer wave length signal beam and an idler beam;

optical parametric amplifier crystals means, arranged in a matrix, for amplifying said signal beam, for depleting said pulse beam, and for generating said idler beam;

phase conjugate mirror means operatively disposed in alignment with said optical parametric amplifier matrix means for reversing the phase of said incident signal, pump and idler waves and the direction of propagation of said waves;

filter means operatively disposed intermediate said optical parametric means and said phase conjugate mirror means for removing a residual pump laser beam and/or said idler beam; and idler separator means operatively disposed intermediate said beam combiner/splitter means and said first optical insolator means for splitting off said idler beam prior to said amplified signal beam reaching said first optical isolator means.

2. A high brightness optical parametric amplifier array as recited in claim 1 wherein said first optical isolator means includes a first Faraday isolator.

3. A high brightness optical parametric array as recited in claim 2 wherein said second optical isolator means includes a second Faraday isolator.

4. A high brightness optical parametric array as recited in claim 3 wherein said beam combiner/splitter means includes a polarizer for type I phase matched parametric amplification where said signal and idler beams have polarizations perpendicular to said pump beam polarization.

5. A high brightness optical parametric array as recited in claim 4 wherein said amplifier crystal means includes a number of parallel optical parametric amplifiers arranged in a matrix.

6. An optical parametric array as recited in claim 5 wherein each optical parametric amplifier may consist of just one non linear crystal, a pair of compensated crystals in series, or several crystals in series.

7. An optical parametric array as recited in claim 6 wherein said phase conjugate mirror means includes a lens and a stimulated Brillouin scattering cell.

8. An optical parametric array as recited in claim 7 wherein said phase conjugate mirror means includes an electromechanical deformable adaptive optics mirror.

9. An optical parametric array as recited in claim 8 wherein said idler separator means includes a dichroic mirror to split off said idler beam prior to the idler signal reaching said first optical isolator means.

10. An optical parametric array as recited in claim 9 wherein said phase conjugate mirror means includes a dispersive prism positioned intermediate said lens and said optical parametric amplifier array causing each wave length to come to a focus in a separate volume of said stimulated Brillouin cell.

* * * * *